COAXIAL LINE TERMINATION

Filed March 8, 1965 2 Sheets-Sheet 1

INVENTORS
HENRY J. CALDERHEAD, DECEASED
BY CATHARINE E. CALDERHEAD,
EXECUTRIX,
PHILIP F. PULJER

BY Bosworth, Sessions, Herrstrom & Knowles
ATTORNEYS

Jan. 3, 1967 H. J. CALDERHEAD ET AL 3,296,560

COAXIAL LINE TERMINATION

Filed March 8, 1965 2 Sheets-Sheet 2

INVENTORS.
HENRY J. CALDERHEAD, DECEASED,
BY CATHARINE E. CALDERHEAD,
EXECUTRIX,
PHILIP F. PULJER

BY Bosworth, Sessions, Herrstrom & Knowles
ATTORNEYS.

United States Patent Office 3,296,560 Patented Jan. 3, 1967

3,296,560

COAXIAL LINE TERMINATION

Henry J. Calderhead, deceased, late of Euclid, Ohio, by Catharine E. Calderhead, administratrix, Euclid, Ohio, and Philip F. Puljer, Parma, Ohio, assignors to Bird Electronic Corporation, a corporation of Ohio Filed Mar. 8, 1965, Ser. No. 439,522
14 Claims. (Cl. 333—22)

This invention relates to transmission lines and, more particularly, to an improved power attenuator in the form of a line termination for coaxial lines.

It is frequently necessary to employ a line termination type attenuator to attenuate the power on a transmission line and to monitor the attenuated power through another transmission line. This occasion arises when it is necessary to connect a meter into a coaxial line to measure the voltage or power being applied to the coaxial line from a signal generator. It is well known in the art that an attenuator is a network designed to introduce a known loss between two resistive impedances $Z_1$, $Z_2$ to which the input and output impedances of the attenuator are matched. Stated in another way, an attenuator is a network designed introduce a predetermined loss when connected between resistive impedances $Z_1$ and $Z_2$ to which the input and output impedances of the attenuator are matched. Either $Z_1$ or $Z_2$ may be the source and the other the load. The attenuation of such networks expressed as a power ratio is the same regardless of the direction of transmission. The particular embodiment of attenuator network herein disclosed is of the T type including three resistors designated $R_1$, $R_2$ and $R_3$. The general arithmetical equations for the values of resistors $R_1$, $R_2$ and $R_3$ are as follows:

$$R_3=\frac{2\sqrt{N}Z_1Z_2}{N-1} \quad (1)$$

$$R_1=Z_1\frac{(N+1)}{(N-1)}-R_3 \quad (2)$$

$$R_2=Z_2\frac{(N+1)}{(N-1)}-R_3 \quad (3)$$

where:

$Z_1$ and $Z_2$ are the terminal impedances (resistive) to which the attenuator is matched $R_1$ and $R_2$ are the series connected resistors of the T cross-arm and $R_3$ is the shunt connected resistor of the stem of the T N is the ratio of the power from the source absorbed by the attenuator to the power delivered to the load For the symmetrical T in which the impedances $Z_1$ and $Z_2$ are equal, the general Equations 1 through 3 reduce to:

$$R_3=\frac{2Z\sqrt{N}}{N-1}=\frac{2ZK}{K2-1} \quad (4)$$

$$R_1=R_2=Z\frac{\sqrt{N}-1}{\sqrt{N}+1}=Z\frac{K-1}{K+1} \quad (5)$$

where:

K is the ratio of the attenuator input current to the output current into the load. When $Z_1=Z_2$, $K=N$.

Formulas 1 through 5 are based on the assumption that the attenuator is terminated approximately by its proper terminal impedances $Z_1$ and $Z_2$ and they hold for deviations of attenuator arms and load impedances up to at least ±20%.

Accordingly, it is an object of this invention to provide an improved attenuator which is economical, simple in construction and employs a minimum of parts.

It is another object of this invention to provide an improved attenuator for coaxial lines.

It is a still further object of this invention to provide a pair of nonreflecting line terminations between a pair of coaxial lines and to connect the nonreflecting line terminations to define an attenuator.

It is another object of this invention to provide a coaxial line with a T-network attenuator in which the T-network matches the impedance of one section of the coaxial line to another section of the line, which T-network is formed from a pair of nonreflecting line terminations each comprising a horn-shaped outer conductor and an elongated inner resistive conductor; in the contemplated arrangement one of the horn-shaped outer conductors is connected to at least one of the resistive conductors and one of the resistive conductors is connected to the other at a point intermediate the ends of the latter.

Briefly, we have discovered that an improved coaxial line power attenuator can be provided in which a pair of nonreflecting resistive coaxial line terminations is employed. In accordance with one aspect of this invention, one of the nonreflecting line terminations terminates one coaxial line in the characteristic impedance of said one line and the other nonreflecting line terminates the other coaxial line in the characteristic impedance of said other line and these nonreflecting resistive line terminations are connected together in back-to-back relation to define an attenuator.

In accordance with a more specific aspect, this invention employs two nonreflecting line terminations of the resistive type in which a horn-shaped outer conductor tapers inwardly toward an axially aligned resistor. One example of this type of termination is disclosed in Bird et al. Patent No. 2,814,776. The two nonreflecting line terminations are connnected by physically and electrically joining the end of one of the resistors to an intermediate point of the other resistor to define an impedance matching network. Advantageously, this connection produces a T attenuator from only two resistors.

In accordance with still other aspects of this invention, we have discovered a combination of two nonreflecting line terminations, each having a tapered outer conductor and an axial resistor which defines an attenuator. In this combination, we connect the resistors so that the outer conductors taper outwardly for distances more remote from each other, or in a "back-to-back" connection.

In accordance with still more specific aspects of this invention, we have discovered that a T type coaxial line attenuator can be formed from a combination of two nonreflecting resistive coaxial line terminations, each including a horn-shaped outer conductor which tapers inwardly toward an axially aligned resistor. Before electrically connecting the terminations, they are relatively positioned so that the horn-shaped outer conductors taper outwardly from each other. One illustrative embodiment of this combination is electrically connected by connecting the resistor of one termination intermediate the resistor of the other termination, connecting the horn of the other termination to the resistor of the other termination and by connecting the horns together.

The following detailed description of a suitable embodiment considered in conjunction with the accompanying drawings forms a part of the specification and constitutes the best known mode of practicing the invention.

Figure 1:
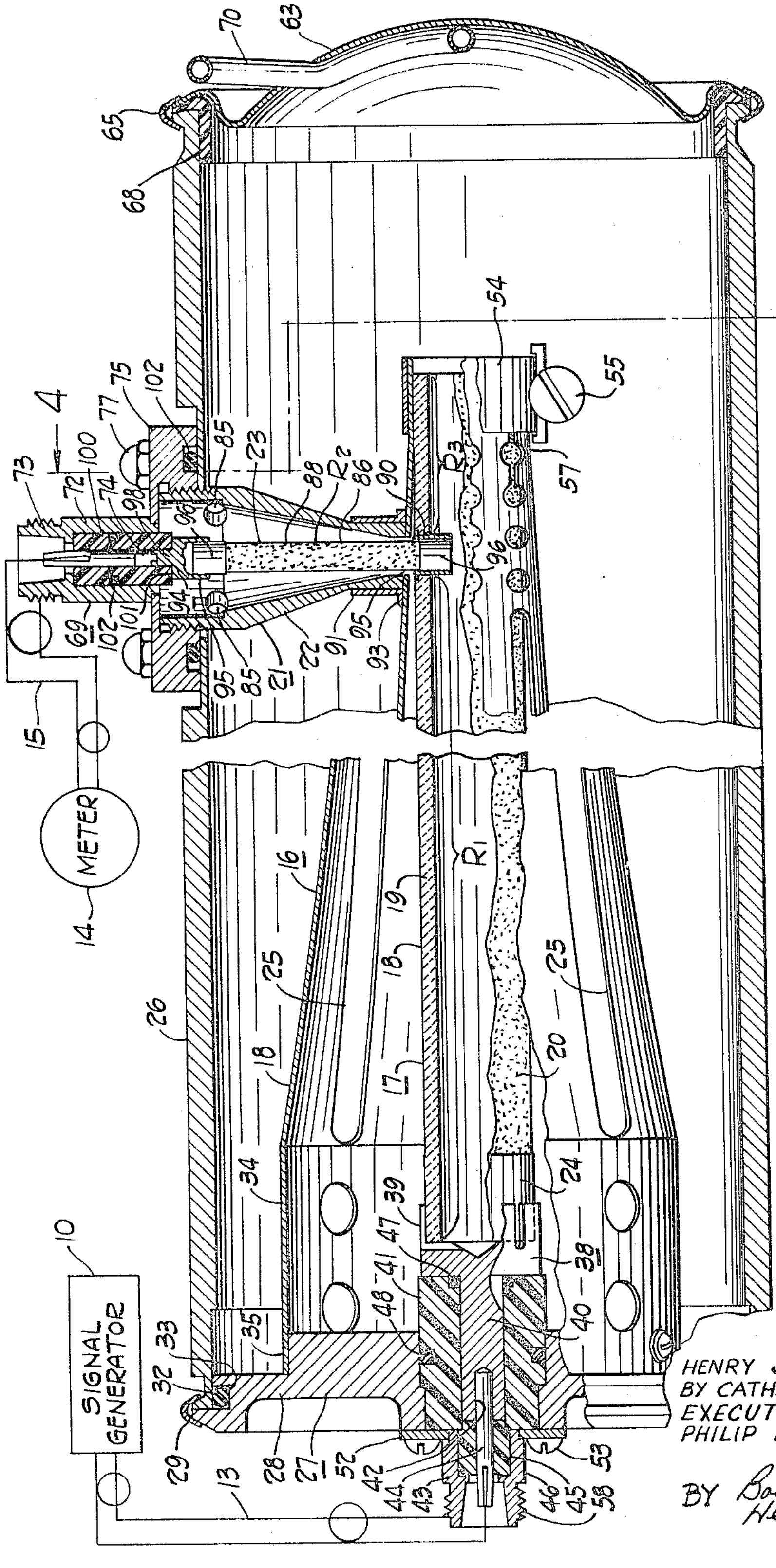
FIG. 1 is an elevation, partly broken away, and in section, of an attenuator according to one illustrative embodiment of this invention, schematically illustrating the manner of connection between a radio frequency generator or transmitter and a load, which in this instance is a meter.

FIG. 1 depicts a high frequency transmission system employing one embodiment of attenuator according to this invention. As therein depicted, a signal generator 10 is connected through an illustrative attenuator 12 to a meter 14 by means of a pair of coaxial cables 13, 15. The signal generator 10 and the meter 14 may be of any convenient type well known in the art. The impedances to be matched by the attenuator 12 are the characteristic impedances of the coaxial lines 13, 15 and their respective terminations remote from the attenuator 12. It is well known in the art that the characteristic impedance of a coaxial line is determined at least in part by the ratio of the inner diameter of the outer conductor to the outer diameter of the inner conductor. It is also well known that for reflectionless transmission, the impedance of each portion of a transmission line should match the next portion of the line. Thus, an attenuator inserted in a transmission line should match the impedance of the line on each side of the attenuator. In this particular instance, the impedances of coaxial line 13, 15 are the same. It is, however, within the scope of this invention to employ an attenuator 12 between coaxial lines 13, 15 in which the impedances of coaxial lines 13, 15 are dissimilar. Advantageously, the attenuator 12 comprises a pair of nonreflecting impedance matching terminations connected back-to-back to define a T-type attenuator.

The coaxial line 13 is connected to a first nonreflecting termination 16 which includes a resistive inner conductor, or resistor, 17 and a tapered, or horn-shaped outer conductor 18. The first termination 16 is connected to a second non-reflecting termination 21, including a horn-shaped outer conductor 22 and a resistive inner conductor, or resistor, 23 to define a T type attenuator in a manner which will be subsequently described. The resistor 17 may be formed of a hollow ceramic dielectric cylinder 19 with a coating 20 of resistive material, such as carbon, on the exterior surface. The ends of the cylinder may be painted with a metal conductive film to form bands 24 so that electrical connections to the resistive coating 20 can be made through the conductive paint bands 24. Horn-shaped conductor 18 is provided with a plurality of apertures 25 which permits the circulation of a dielectric coolant around resistor 17.

Figures 3, 4, 5, 6, 7:
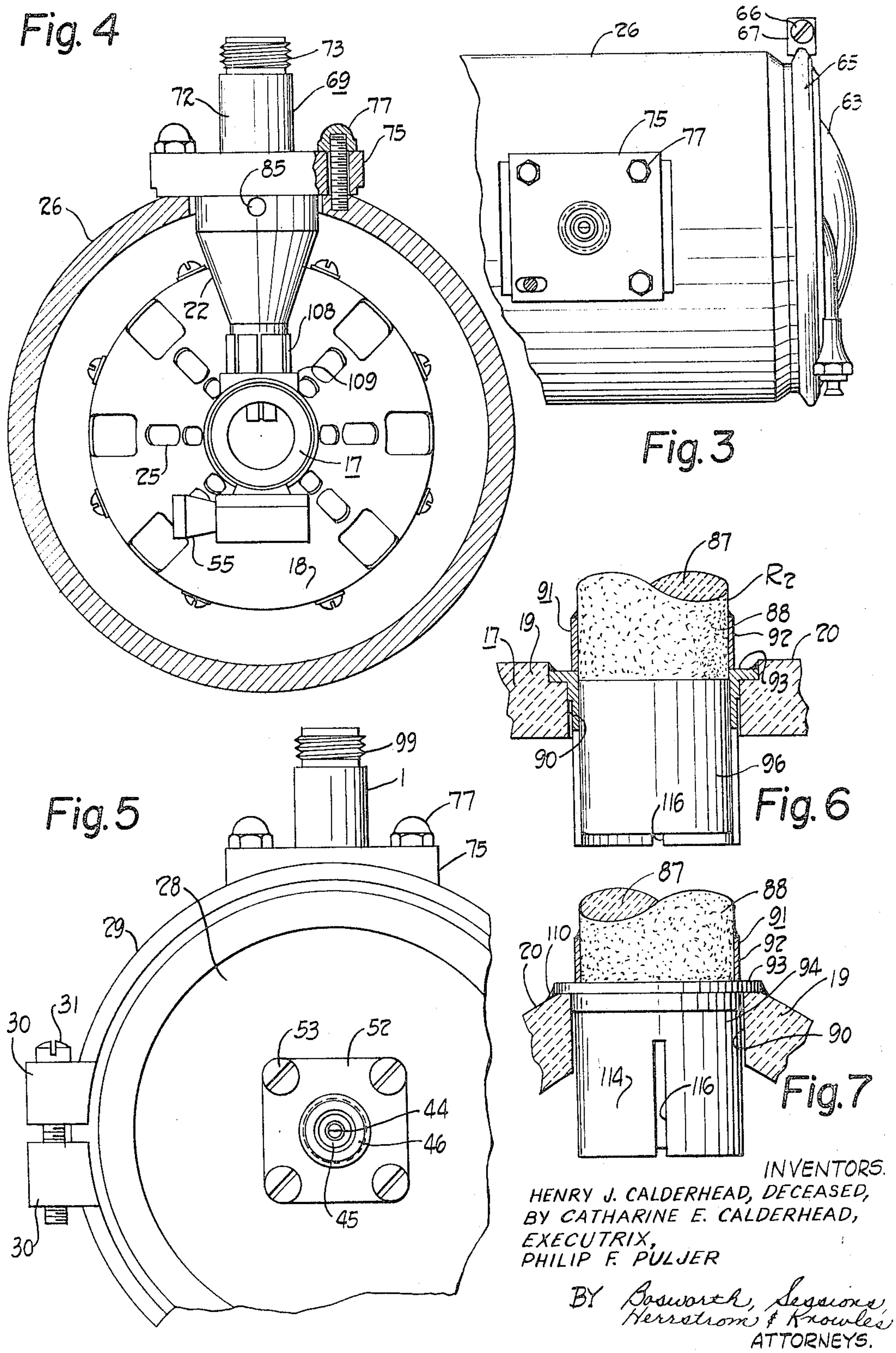
FIG. 3 is a partial plan view of the attenuator of FIG. 1.
FIG. 4 is a view, in section, taken along the lines 4—4 of FIG. 1.
FIG. 5 is an end view of the left hand end of the attenuator as seen in FIG. 1.
FIG. 6 is a view, partly in section, of a portion of the attenuator of FIG. 1 to an enlarged scale.
FIG. 7 is a view of the portion shown in FIG. 6 taken at an angle of 90° relative to the reference plane of FIG. 6.

The conductors of first termination 16 are supported coaxially within a cylindrical housing 26 by an end wall 27 on housing 26 which encloses the end of housing 26 in fluid sealing relationship. The end wall 27 includes a metal annular end wall member 28 which engages the edge of cylinder 26 and is held in position by a clamping ring 29. The ring 29 terminates in a pair of ends 30 which are pulled together by screw 31 as seen in FIG. 5. An O-ring 32 is compressively held in a recess 33 of member 28 and defines a fluid seal between annular member 28 and cylindrical housing 26. A cylindrical portion 34 of tapered outer conductor 18 engages a cylindrical extension 35 of the annular member 28 and is secured thereto by suitable means such as screws 36. The inner conductor is insulatingly supported in annular end wall member 28 by means of a coaxial line connector section and bushing arrangement, which will be subsequently described. The support for resistor 17 includes a resistor contact 38 which has a terminal cylindrical portion 39 overlapping and electrically connecting the left hand paint band 24, as viewed in FIG. 1. Contact 38 includes a reduced cylindrical portion 40 extending substantially through an insulating cylinder 41 and having a hole 42 drilled therein to receive a connector of a coaxial line connector section 43. The connector section 43 includes a coaxial metallic plug, or inner coaxial line connector 44 which is inserted in a hole 42 of contact 38 and connected to the inner conductor of cable 13. A second annular insulator 45 encircles plug 44 to define an aligning spacer between plug 44 and the outer connector 46 of connector section 43. The elements of end wall 27 are provided with fluid sealing gaskets. For example, an O-ring seal 47 is positioned between insulator ring 41 and resistor contact member 38 in fluid sealing relationship and a second O-ring 48 is provided between annular end wall member 28 and annular insulating cylinder 41. Similarly, the previously mentioned O-ring 32 defines a fluid seal between end wall member 28 and cylindrical housing 26. The electrical connection between connector section outer connector 46 and horn-shaped outer conductor 18 includes a flange 52 which is integrally formed on outer connector 46 and secured to the annular metallic end wall member 28 by means of metal screws 53. Outer conductor 18 is connected to end wall member 28 through the integral cylindrical portion 34.

The right hand portion of termination 16, as viewed in FIG. 1, includes a clamping ring pulled tightly around the end of tapered outer conductor 18 by means of a screw 55 which threadably engages a pair of ends 56 of clamp 54. Advantageously, conductor 18 has a plurality of notches 57 to permit the clamp 54 and the screw 55 to pull the outer conductor 18 into good electrical contact with an end terminal 58 of resistor 17.

The opposite end of cylindrical housing 26 from end-wall 27 is enclosed in fluid sealing relationship by an end wall member 63 which is secured to cylindrical housing 26 by means of a clamping ring 65, which clamping ring is tightened by means of a screw 66 which threadably engages the ends 67 of ring 65. An annular resilient fluid sealing ring 68 is positioned between member 63 and cylindrical housing 26. A fluid conduit 70 is a connection for a coolant circulating system, not shown, which is preferably provided for conducting dielectric cooling fluid such as "Dowtherm A" to and from the interior of cylindrical housing 26 to conduct away the heat generated either by the dissipation of radio frequency energy in the resistive element or by the coolant absorption of electromagnetic energy.

FIGS. 1 and 3 through 5 show a second coaxial line connector section 69 by which coaxial cable 15 is connected to the second nonreflecting line terminating unit 21. This connector section 69 includes an outer conductor cylindrical coaxial line coupling member 72 which is threaded at 73 to receive the outer conductor and a plug type inner conductor coupling member 74, similar to plug 44. In assembling attenuator 12, the second resistor 23 is connected to the second connector section 69 in a manner which will be subsequently described in detail. The second horn-shaped outer conductor is then threadably engaged with plate 75. Plate 75 is placed in the position shown in FIG. 1 with resistor 23 extending into resistor 17 intermediate the ends thereof. A plurality of bolts 77 is inserted through plate 75 and threaded into housing 26. Advantageously, as shown in FIG. 3, plate 75 is provided with oval-shaped slots 78 which receive bolts 77 and extend in the longitudinal direction of housing 22. Bolts 77 may be loosened and plate 75 may be moved to a position in which the second line termination 21 is aligned with apertures in first outer conductor 18 and resistor 17 so that the first and second terminations 16, 21 may be relatively positioned. The second nonreflecting line termination 21 is electrically connected to the first nonreflecting line termination 16 by connecting the outer conductors together and connecting resistor 23 to resistor 17 around their intersecting surfaces to define a T-type attenuator in a manner which will be subsequently described.

Figure 2:
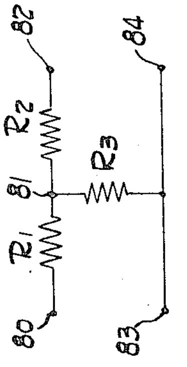
FIG. 2 is a schematic representation of the equivalent circuit of the attenuator of FIG. 1.

The equivalent circuit of the attenuator network formed by the terminations 16, 21 is shown in FIG. 2. This network is the well known T-type, four terminal network including a group of three resistors, $R_1$, $R_2$ and $R_3$. Resistors $R_1$ and $R_2$ are serially connected between two of the network terminals 80, 82 at a common terminal 81. Resistor $R_3$ is connected to common terminal 81 and to the remaining two of the network terminals 83, 84. I In accordance with the illustrative embodiment of FIG. 1, the terminals 80, 82, of FIG. 2 correspond with the inner conductor terminals 44, 74 of connector sections 43, 69, respectively while terminals 83, 84 correspond with outer conductor connectors 46, 72, respectively. Resistors $R_1$ and $R_3$ correspond with portions of the resistor 17 and resistor $R_2$ corresponds with resistor 23 of nonreflecting termination 21. The portion of resistor 17 which lies between the connection with resistor 23 and end clamp 54 is designated $R_3$ in FIG. 1 and this portion of resistor 17 is the shunt-connected resistor which bridges the inner and outer conductors of the attenuator network to define the stem of the T network, as shown in FIG. 2. The attenuator resistor defined by resistor 23 corresponds to the series connected resistor $R_2$ and the remaining portion of resistor 17 designated $R_1$ in FIG. 1 corresponds to the second series connected network resistor, these series resistors being in the crossbar of the T network. The connection between terminals 83, 84 of FIG. 2 is defined by the serially connected outer conductors 18, 22.

In FIG. 4 there is depicted a view in section, taken along the lines 4—4 of FIG. 1, which view shows the coaxial alignment of resistor 17, the tapered outer conductor 18 and the cylindrical housing 26. In this figure the radial spacing of apertures 25 in conductor 18 is clearly shown and these apertures permit the circuation of the cooling dielectric fluid around resistor 17 in a manner well known in the art. Similarly, second horn-shaped outer conductor 22 is provided with coolant passages 85 (FIG. 1). Coolant may enter the second termination through the annular passage between second resistor 23 and the lower end of horn 22 and may exit through passages 85. FIG. 4 also shows the coplanar arrangement of the axes of nonreflecting line termination 21 and line termination 16. Nonreflecting termination 21 includes a second cylindrical resistor 23 which is formed by coating a ceramic rod, or cylinder, 87 with a resistive coating 88. Resistor 23 is encircled by the second horn-shaped outer conductor, or horn 22 which has an inner surface tapering outwardly for distances more remote from line termination 16. Advantageously, the cylindrical resistor 23 extends through an aperture 90 in ceramic cylinder 19 and the resistors 17, 23 are connected together in an arcuate area tangent resistor 23 in a manner which will be described in detail in conjunction with FIGS. 6 and 7. Horn 22 is connected to the tapered conductor 18 of the first nonreflecting termination by means of an annular ring, or sleeve, 91 including cylindrical portion 92 and a perpendicular flange portion 93 which portions may be welded, or otherwise secured, to each of the tapered conductors, or horns 22, 18, respectively. The lower end of second horn 22 does not electrically connect with second resistor 23 but is spaced therefrom to define an annular coolant passage 95 (FIG. 1).

The end of resistor 23 remote from resistor 17 is connected to a contact member 94, which contact member is similar to contact member 38. Member 94 includes a sleeve portion 95 extending over and making electrical contact with an electrically conductive paint band 96, which band overlaps the resistive coating 88 of resistor 23 in a manner well known in the art. The contact member 94 includes a reduced cylindrical portion 98 which is bored to receive a metallic connecting plug 74. The reduced portion 98 is encircled by an annular dielectric bushing 100 which snugly engages the second connector section outer contact member 72. A pair of O-rings 101, 102 is provided to define a fluid seal between the dielecric bushing 100, the connecting plug 74 and the cylindrical coupling member 72.

Referring now to FIGS. 6 and 7, there are depicted two views taken at right angles relative to each other and showing to an enlarged scale the details of the connection between the second resistor 23 and the first resistor 17. As therein depicted, resistor 23 includes a film of resistive material 88 which is encircled by a conducting collar, or annular member, 91 having a perpendicular flange 93 which is brazed, or otherwise secured, to coating 20 of resistor 17 such as by means of a conductive coating of paint to provide good electrical contact between the resistors 17, 23 as indicated at 110. Annular member 91 is provided with a skirt portion 114 which is notched with a plurality of notches, such as shown at 116, as by sawing. The notched skirt portion 114 may be compressed to facilitate insertion in aperture 90. Conductive paint band 96 connects resistive material 88 and member 91.

In the illustrative embodiment of FIG. 1, resistors $R_1$ and $R_2$ are of equal value because the characteristic impedances of coaxial cables 13, 15 are identical. If, however, the impedances of these coaxial lines were dissimilar, then the values of resistors $R_1$, $R_2$ would be mathematically determined on the basis of the different characteristic impedances, employing Equations 1 through 3, above. In this embodiment, coaxial cables 13, 15 each have an impedance of 50 ohms and the resistors $R_1$, $R_2$ are 46.9 ohms while resistor $R_3$ is 3.17 ohms.

In accordance with the patent statutes, the principles of the present invention may be utilized in various ways, numerous modifications and alterations being contemplated, substitution of parts and changes in construction being resorted to as desired, it being understood that the embodiments shown in the drawing are given merely for purposes of explanation and illustration without intending to limit the scope of the claims to the specific details disclosed.

What we claim and desire to secure by Letters Patent of the United States is:

1. An attenuator for connecting between a pair of coaxial lines, each having an inner and an outer conductor, said attenuator comprising:

a first resistive coaxial line termination having a first resistor and a first horn-shaped member encircling said first resistor, tapering to one end of said first resistor and connecting therewith;

a second resistive coaxial line termination including a second resistor and a second horn-shaped member, said horn-shaped members being mounted to taper outwardly from each other, and said resistors being connected together, and wherein said first resistor is elongated axially of the first termination and said second resistor is connected to said first resistor intermediate the ends thereof.

2. The combination according to claim 1 wherein said second resistor extends radially from said first resistor.

3. A coaxial line attenuator comprising:

a first nonreflecting line terminating unit including a horn-shaped outer conductor and a resistor axially positioned relative to said outer conductor; and a second nonreflecting line terminating unit including a second horn-shaped outer conductor and a second resistor disposed axially within said second conductor, said second resistor being connected to said first resistor at a point intermediate the ends of the latter, said horn-shaped outer conductors being connected together at a common juncture and each increasing in size away from said juncture.

4. The combination according to claim 3 wherein said juncture of the horn-shaped conductors is at a point intermediate the ends of one of them.

5. A coaxial power attenuator for a first and a second coaxial line, said attenuator comprising:
  a first horn-shaped outer conductor adapted to be coupled to the outer conductor of the first coaxial line;
  a first resistor coaxial with said first horn-shaped outer conductor and having spaced terminals one of which is adapted to be connected to the inner conductor of the first coaxial line;
  a second horn-shaped outer conductor coupled to said first horn-shaped outer conductor and adapted to be connected to the outer conductor of the second coaxial line; and
  a second resistor connected to said first resistor intermediate and spaced from both terminals of said first resistor and positioned axially relative to said second horn-shaped outer conductor.

6. The combination according to claim 5 for coaxial lines having equal characteristic impedances wherein said attenuator defines a T network in which the resistances of said second resistor and the portion of said first resistor between said one terminal and the connection of said second resistor are equal.

7. An attenuator for a coaxial transmission system having a first and a second coaxial line comprising:
  housing means including side wall means and a pair of end wall members secured to said side wall means in fluid sealing relationship;
  a first resistor mounted on one of said end wall members;
  contact means connected to said first resistor and extending through said one of said end wall members;
  a first horn-shaped conductor mounted on said one of said end wall members coaxially with said first resistor;
  means for connecting said first resistor and said first conductor to the respective inner and outer conductors of said first coaxial line;
  a second resistor mounted within said housing means and having a first terminal portion connected intermediate said first resistor;
  a second horn-shaped conductor mounted within said housing coaxially with said second resistor and tapering outwardly from said first horn-shaped conductor; and
  means for connecting said second resistor and said second horn-shaped conductor to said second coaxial line.

8. The combination according to claim 7 further including means for connecting one end of said first resistor to said first horn-shaped conductor.

9. The combination according to claim 7 including means for connecting said second horn-shaped conductor to said first horn-shaped conductor.

10. The combination according to claim 7 wherein said first resistor has a first and a second resistive portion on opposite ends thereof, said first resistive portion having a resistance related to the impedance of said first coaxial line, the second resistor having a resistance related to the impedance of said second coaxial line, said second resistive portion having a resistance related to the impedance of said coaxial lines.

11. A T-type attenuator for coaxial lines comprising:
  attenuator housing means;
  a first line termination including a first resistor and a first tapered conductor mounted in said housing means in coaxial relationship;
  a second line termination including a second resistor and a second tapered conductor mounted in said housing means in coaxial relationship;
  connecting means for connecting one end of said second resistor to said first resistor to define first and second resistive portions on said first resistor, the resistance of said second resistor and said resistive portions being related according to the following equations, $$R_3=\frac{2\sqrt{N Z_1 Z_2}}{N-1} \quad (1)$$

$$R_1=Z_1\left(\frac{N+1}{N-1}\right) \quad (2)$$

$$R_2=Z_2\left(\frac{N+1}{N-1}\right) \quad (3)$$

where:
  $Z_1$ and $Z_2$ are the terminal impedances (resistive) to which the attenuator is matched
  $R_1$ and $R_2$ are the first portion of said first resistor, respectively, and $R_3$ is the second portion of said first resistor
  N is the ratio of the power from the source absorbed by the attenuator to the power delivered to the load, and
  means for connecting said line terminations to separate coaxial lines.

12. A T-type attenuator according to claim 11 wherein said first resistor is cylindrical and has an aperture therein to receive said second resistor.

13. An attenuator according to claim 12 wherein said second resistor is cylindrical and wherein said resistor connecting means includes an annular member having a radial flange thereon, conductor means connecting said annular member to said second resistor and conductor means connecting said flange to said first resistor.

14. An attenuator according to claim 13 wherein said tapered conductors are connected together and taper outwardly from each other.

References Cited by the Examiner

UNITED STATES PATENTS

| | | | |
|---|---|---|---|
| 2,620,396 | 12/1952 | Johnson et al. | 331—81 |
| 2,814,776 | 11/1957 | Bird et al. | 324—95 |
| 2,875,405 | 2/1959 | Frederico | 333—22 X |
| 2,884,595 | 4/1959 | Stevens | 333—81 |
| 2,968,774 | 1/1961 | Rodriguez | 333—81 |
| 3,054,074 | 9/1962 | Bird et al. | 333—22 |
| 3,174,123 | 3/1956 | Frederico | 333—81 |

HERMAN KARL SAALBACH, *Primary Examiner.*

R. F. HUNT, *Assistant Examiner.*